United States Patent

[11] 3,590,933

[72] Inventor Arthur Walter Forman
 Northwood, England
[21] Appl. No. 783,887
[22] Filed Dec. 16, 1968
[45] Patented July 6, 1971
[73] Assignee Driver Southall Limited
 Birmingham, England

[54] WEIGH BEAMS
 17 Claims, 8 Drawing Figs.
[52] U.S. Cl. .................................................. 177/229,
 177/178, 73/141
[51] Int. Cl. ....................................................... G01g 3/08
[50] Field of Search ............................................. 177/229,
 255, 256, 178; 73/141 A

[56] References Cited
UNITED STATES PATENTS

| | | | | |
|---|---|---|---|---|
| 410,952 | 9/1889 | Bergman | | 177/229 |
| 2,962,893 | 12/1960 | Ormond | | 73/141 A |
| 3,309,922 | 3/1967 | Green | | 73/141 A |
| 3,387,679 | 6/1968 | Giulie et al. | | 177/229 |

Primary Examiner—Richard B. Wilkinson
Assistant Examiner—George H. Miller, Jr.
Attorney—Norris and Bateman ABSTRACT: A weighing apparatus comprising a pair of beam members, each having a load or resistant carrying portion which extends on the same side of the fixed supporting fulcra of the beam members, said beam members being interconnected so that deflection in one direction of the said portion of one of the members causes deflection of the like portion of the other member in the opposite direction. The beam members each operate as one arm or half-beam of a balance (which may be of Roberval type) and which is of compact construction and has low sensitivity to external vibration.

PATENTED JUL 6 1971

INVENTOR

ARTHUR W. FORMAN

BY Morris & Bateman

INVENTOR
ARTHUR WALTER FORMAN

INVENTOR
ARTHUR W. FORMAN

BY Norris & Bateman

WEIGH BEAMS

This invention relates to weighing apparatus and has as its object the provision of such apparatus which is of compact construction, and of low sensitivity to external vibration.

According to the invention weighing apparatus comprises a pair of beam members, each having a load or resistant carrying portion which extends on the same side of the fixed supporting fulcra of the beam members; and means interconnecting said beam members so that deflection in one direction of the said portion of one of the members causes deflection of the like portion of the other member in the opposite direction.

Three embodiments of the invention are hereinafter more particularly described, by way of example only, with reference to the accompanying drawings in which.

Figure 1:
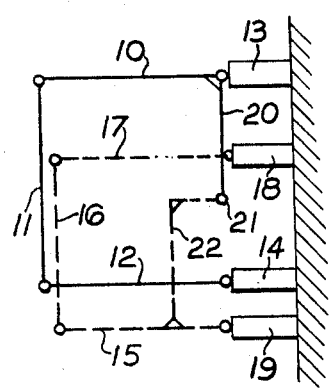
FIG. 1 is a diagrammatic representation of a Roberval type lever system according to the invention shown in its undeflected position.

Referring to FIG. 1, an upper linkage comprises a beam member 10, a vertical leg 11 and a stay 12 which are pivoted to one another and also to fixed supports 13 and 14 lying in a vertical plane to form a parallelogrammic linkage as shown. A lower linkage comprises parts 15, 16 and 17 which are pivoted together and to fixed supports 18 and 19 in a manner similar to respective parts 10, 11 and 12 of the upper linkage, the support 18 being positioned between the supports 13 and 14 of the upper linkage so that the two linkages overlap in elevation.

Figure 2:
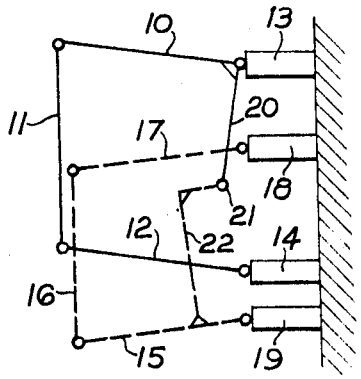
FIG. 2 is a diagrammatic representation of the system shown in FIG. 1 in a deflected position.

The two beam members 10 and 15 are connected by means of an upper arm 20 which is pivoted at 21 to a cranked arm 22 on the lower beam member. Thus when the lower linkage is moved downwardly the upper linkage will move upwardly by virtue of the connecting arms, this position being shown in FIG. 2. If the leg 11 of the upper linkage is provided with a resistant, the leg 16 of the lower linkage can receive a load to be weighed, alternatively the load to be weighed can be applied to the upper leg 11 with a resistant connected to the lower leg 16.

Figure 3:
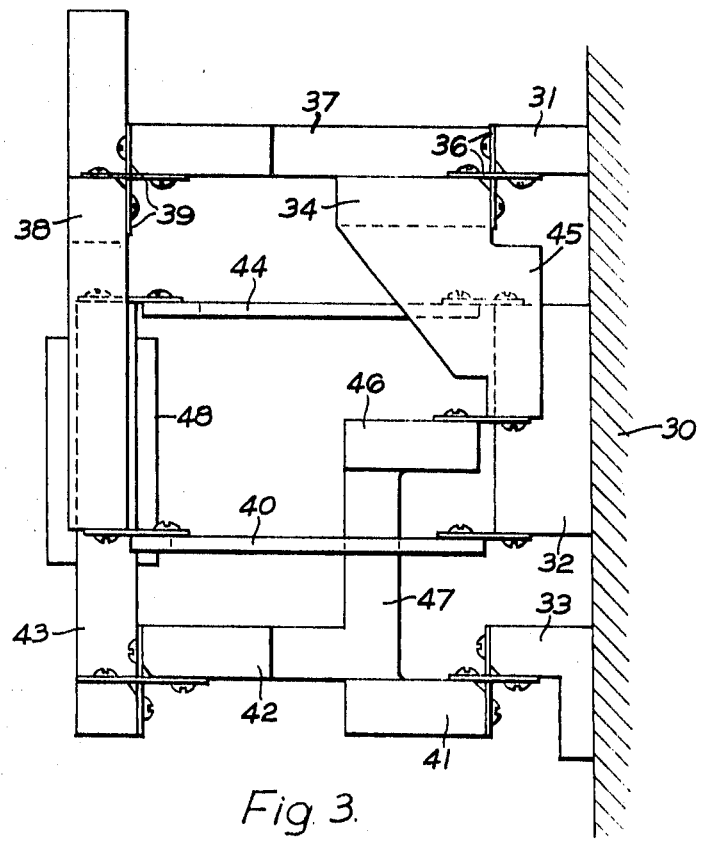
FIG. 3 is a side elevation of a first practical embodiment of a Roberval type lever system according to the present invention.
Figure 4:
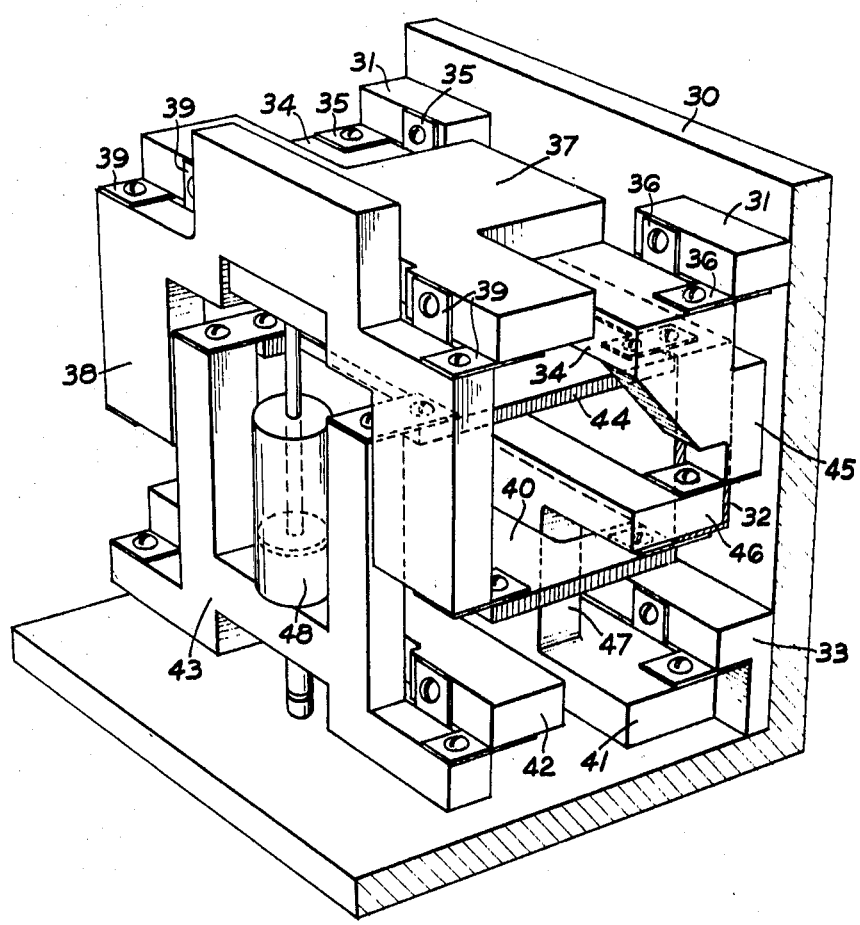
FIG. 4 is a perspective view of the embodiment shown in FIG. 3.

The embodiment of the invention shown in FIGS. 3 and 4 comprises a vertical frame 30 having support brackets 31, 32 and 33 rigidly secured thereto. An upper linkage comprises a light alloy upper beam member in the form of a stepped plate 34, 37 pivoted at an inner edge to the supports 31 by means of cross flexure strips 35 and 36, portion 37 of the plate having its outer edge pivoted to an inverted generally U-shaped leg member 38 by means of the cross flexures 39. The stay of the upper linkage comprises plate 40 connected by horizontal flexures to the leg member 38 and to the support 32. The lower linkage is similar to the upper linkage and comprises a light alloy lower beam member in the form of a stepped plate 41, 42, pivoted by cross flexure strips to the supports 33, portion 42 being pivoted at its front edge by cross flexure strips to a U-shaped leg member 43 extending upwards between the limbs of leg member 38. The upper end of the U-shaped leg member 43 has a stay plate 44 connected thereto by horizontal flexure strips and also pivoted to the support 32 by similar flexure strips.

A pair of integral rigid arms 45 depend downwardly from each end of the portion 34 of the upper beam member. An integral upwardly extending limb 47 extends upwards from portion 42 of the lower beam member through an aperture in stay 40 and includes a transverse bar 46 thereabove connected at each end to the ends of the arms 45 by means of flexure strips.

To damp movements of the two linkages a dashpot 48, which may be of any conventional design, is disposed vertically between the U-shaped leg members 38 and 43.

Figure 7:
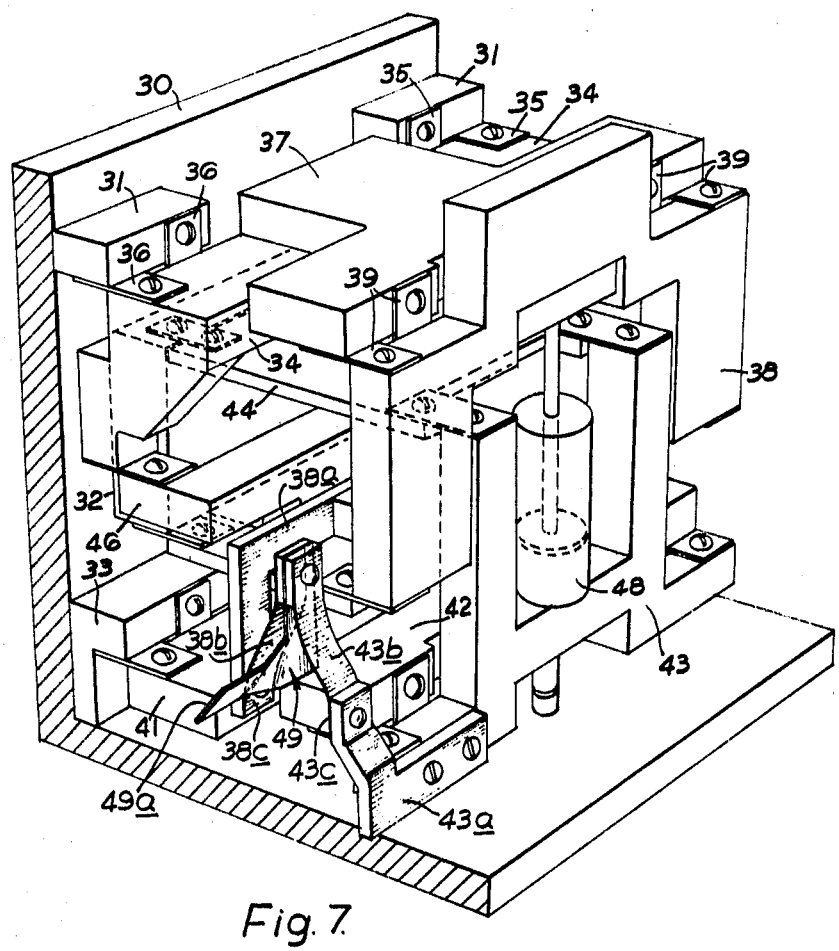
FIG. 7 is a perspective view of the embodiment shown in FIGS. 3 and 4 with a mirror movement detection device mounted thereon.
Figure 8:
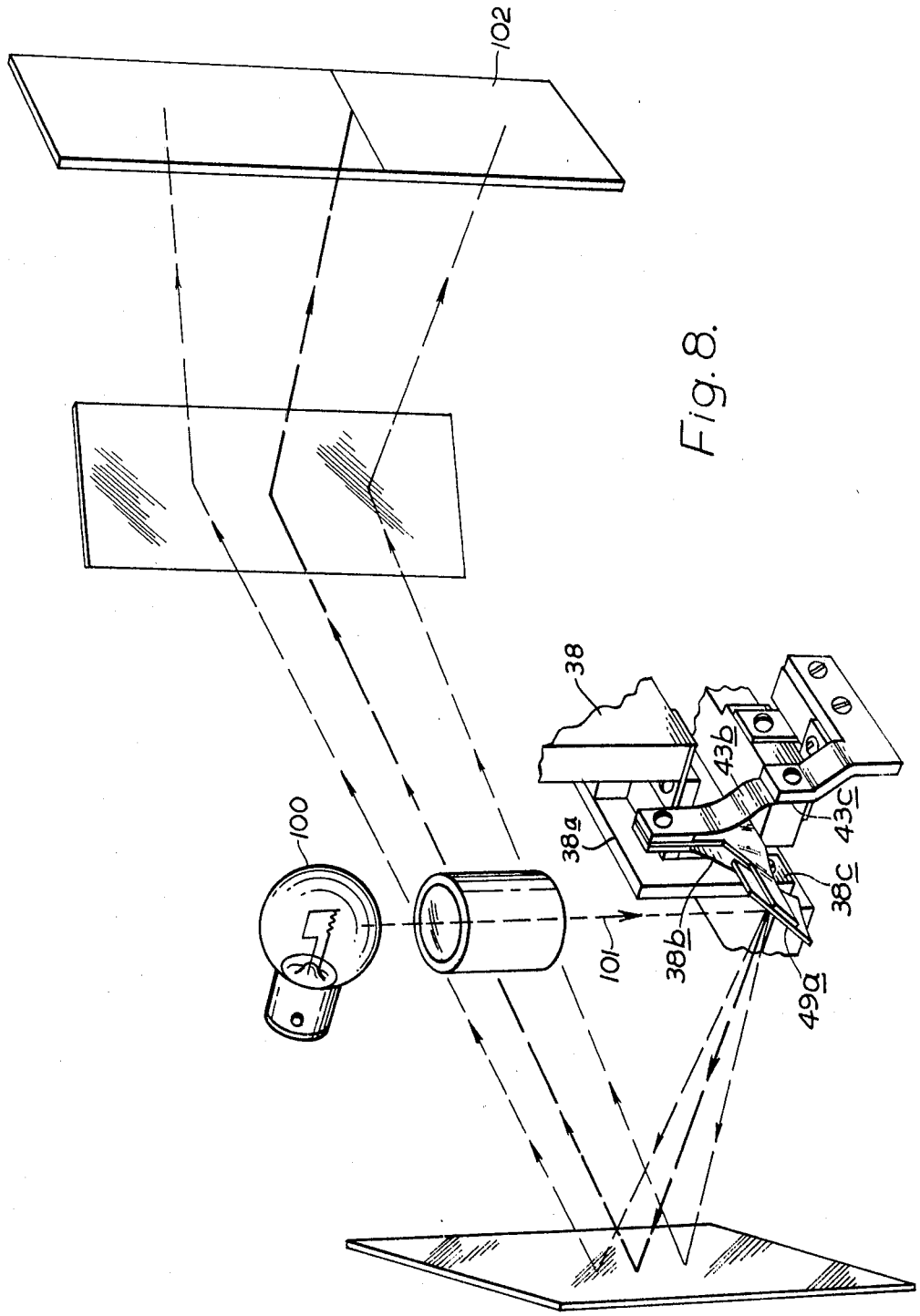
FIG. 8 is a diagrammatic view showing operation of the mirror device of FIG. 7.

A movement detection device shown in FIG. 7 is mounted on the leg members 38 and 43. Leg member 38 mounts a rigid mirror support bracket 38a depending downwards adjacent to the end of stepped plate 42, and leg member 43 mounts a like mirror support bracket 43a which extends upwards. A pair of flexible strips 38b and 43b are each attached at one end to parallel vertical mounting faces 38c and 43c on each of the adjacent free ends of the brackets. These strips extend upwards and are clamped at their upper end on each side of a mirror plate 49 which depends downwards therebetween. At a position halfway along the length of the strips a reflective face 49a is positioned on a lateral extension of mirror plate 49. In use a light source 100 produces a focused ray 101 whose path includes the reflective face 49a of the mirror plate. On deflection of the upper and lower linkages relative movement of the faces 38c and 43c upwards and downwards takes place so flexing the interconnected strips 38b and 43b and rotating the reflective face 49a about an imaginary axis across its center and normal to the direction of relative movement. Movement of the ray of light so caused may be indicated on a screen 102 the relative movement utilized being twice the amount of deflection of one of the linkages alone.

An alternative movement detection device (not shown in the drawings) utilizes a linear variable differential transformer mounted so that its core is connected to one linkage and the windings are connected to the other linkage, relative movement between the linkages causing like movement between the core and windings which is detected and measured by a conventional control circuit.

Figure 5:
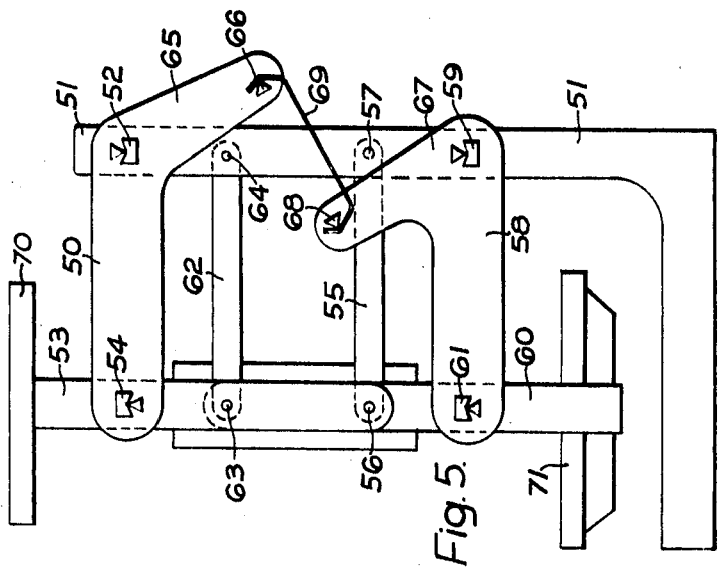
FIG. 5 is a side elevation of a second embodiment of the invention.

A second embodiment of the invention utilizing knife edge pivots is shown in diagrammatic form in FIG. 5 wherein an upper linkage comprises a bell crank lever 50 which is pivoted to a support 51 by means of a knife edge bearing 52 and to a vertically disposed leg member 53, by means of a knife edge bearing 54. A stay 55 is pivoted to the leg member 53 and the support 51 by pins 56 and 57 respectively. The lower linkage comprises a bell crank lever 58 which is pivoted to the support 51 by means of a knife edge bearing 59 and to a vertical leg member 60 by a knife edge bearing 61. A stay 62 is pivoted to the leg member 60 and to the support 51 by means of pivot pins 63 and 64 respectively. The arm 65 of the bell crank lever 50 carries a knife edge 66 and the arm 67 of the bell crank lever 58 carries a knife edge 68. A tension link 69 extends between the knife edges 66 and 68 to connect the two bell crank levers together.

In the embodiment shown leg member 53 mounts a goods pan 70 and leg member 60 mounts a weight carrier 71.

Figure 6:
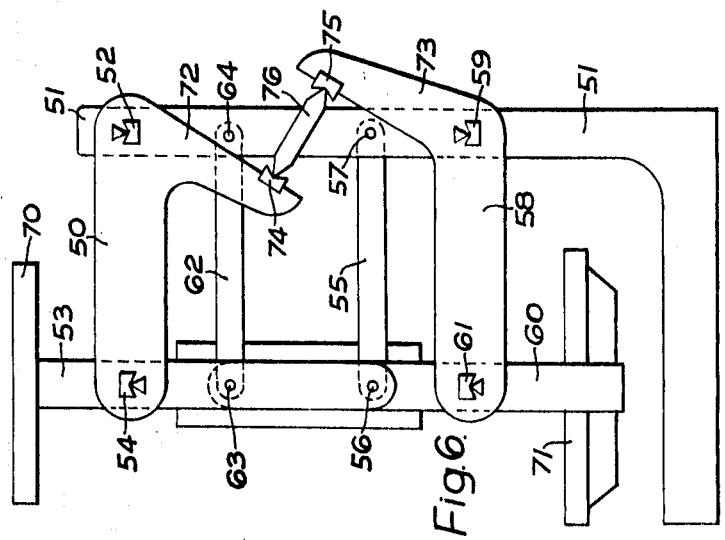
FIG. 6 is a side elevation of a third embodiment being a modification of that shown in FIG. 5.

An alternative arrangement is shown in FIG. 6 in which the connecting link between the linkages is in compression. The device is similar to that shown in FIG. 5 with the exception that the bell crank levers 50 and 58 have arms 72 and 73 respectively disposed to carry bearings 74 and 75 which receive a compression link 76 having a knife edge at each end.

In all the above embodiments the upper and lower linkages are interconnected so as together to act as an even arm Roberval type balance, the linkages each being in effect one half of a Roberval type balance beam of conventional type but said half beams equally extending on the same side of their supporting fulcra. Alternatively a linkage comprising a Roberval type half beam may be interconnected with a simple counterbalancing lever mounted to extend on the same side of its supporting fulcra as the half beam, conveniently below or above said linkage. For example such an arrangement could incorporate only the upper Roberval linkage of the apparatus shown in FIG. 3, comprising upper beam member and arms 34, 37, 45 with leg member 38 and stay 40; counterbalanced by a simple lever consisting only of a member shaped similarly to lower beam members 41, 42 with the limb 47 and bar 46, the latter interconnected with arms 45 by a horizontal flexure on each side, said lever would carry a resistant in the form of a weight adjustably fastened to portion 42 thereof. A dashpot could be disposed between the leg member 38 of the Roberval type half beam and the base of the stand.

The linkage described above have considerable advantages over conventional systems. In particular they are much more compact in that all the moving parts are disposed at one side of a given plane and, furthermore, their design inherently reduces the influence of external vibrations by virtue of the fact that both beam members are subjected to the same vibrations which tend to cancel one another.

The invention is equally applicable to a simple lever type of weigh beam device utilizing two interconnected beam members without the leg members and stays required for the Roberval lever system. Proprietory flexural pivots such as Bendix type pivots, or pivots which do not cross symmetrically may be employed in the construction.

Various types of movement detection devices may be applied to any form of the invention, for example photoelectric cells, reed switches, capacitance or induction devices and other transducers; or lever systems operating an indicator pointer or scale as well as the devices described above.

Fixed and/or adjustable resistant weights may be applied in a number of positions or all or part of the resistant force may be applied by springs, for example a tension spring may be mounted vertically between two arms each extending parallel to one of the beam members and provided with screw adjustment for varying the distance from the supporting fulcrum or pivot of each beam member at which the spring acts thereon thus varying the effecting tension of the spring on the two beams.

I claim:

1. Weighing apparatus comprising fixed support means, upper and lower beam members having their one ends mounted on respective upper and lower fulcra on said support means, one, of said beam members carrying a load to be weighed, the other of said beam members providing a weight offsetting means, both of said beam members extending away from said fulcra in the same direction from the same side of said support means, upper and lower arms rigid with said upper and lower beam members respectively, and linkage means interconnecting said arms so that deflection in one direction of one of said beam members causes deflection in the opposite direction thereto of the other beam member.

2. Weighing apparatus as defined in claim 1, wherein said support means is an upright member.

3. Weighing apparatus according to claim 1 wherein the interconnected arms are crank arms so arranged relative to each other that the linkage therebetween is in compression.

4. Weighing apparatus according to claim 1 in which at least a part of the offsetting means used to balance a load applied thereto is provided by spring means operating on the beam members to resist deflection thereof.

5. Weighing apparatus as defined in claim 1, wherein damping means is connected between two relatively moving parts associated respectively with the upper and lower beam members.

6. Weighing apparatus according to claim 1 wherein at least one of the beam members forms one side of a parallelogrammic linkage also comprising a vertical leg through which the load or resistant is applied thereto, and a stay extending parallel to the beam member between said leg and a fixed support to maintain the leg in a vertical position, so that the linkage operates as one arm or half-beam of a Roberval type balance.

7. Weighing apparatus according to claim 6 wherein said both beam members form parts of parallelogrammic linkages each operating as one arm or half beam of a Roberval type balance so that the interconnected beam members are effective as an equal armed Roberval type balance.

8. Weighing apparatus according to claim 1 wherein the interconnected arms are crank arms so arranged relative to each other that the linkage therebetween is in tension.

9. Weighing apparatus according to claim 8 including at least one beam member fulcrum, parallelogrammic linkage pivot or interconnecting link pivot comprising a flexure strip.

10. Weighing apparatus according to claim 9 having two crossed flexure strips.

11. Weighing apparatus according to claim 1 including indicating means for detecting deflection of the beam members.

12. Weighing apparatus according to claim 11 wherein the indicating means detects relative movement between one beam member and the other beam member.

13. Weighing apparatus according to claim 11 wherein the indicating means includes a transducer.

14. Weighing apparatus according to claim 13 wherein the transducer is a linear variable differential transformer.

15. Weighing apparatus according to claim 11 wherein the indicating means includes at least one movable mirror connected to at least one of the moving parts of the device so as to vary the path of a ray of light in accordance with deflection of the beam members.

16. Weighing apparatus according to claim 15 wherein a linkage of the mirror to relatively moving parts of the apparatus serves both to tilt and support the mirror.

17. Weighing apparatus according to claim 16 wherein the linkage consists of flexible strips arranged so that the mirror is tilted about an imaginary axis across its face midway between its top and bottom edges and normal to the direction of relative movement.